April 27, 1965    W. H. HAMILTON ETAL    3,180,296
CONTINUOUS WAVE ACOUSTIC GUIDANCE SYSTEM
Filed March 5, 1954    4 Sheets-Sheet 1

INVENTORS
WILLIAM H. HAMILTON
ARTHUR NELKIN
BY
ATTORNEYS

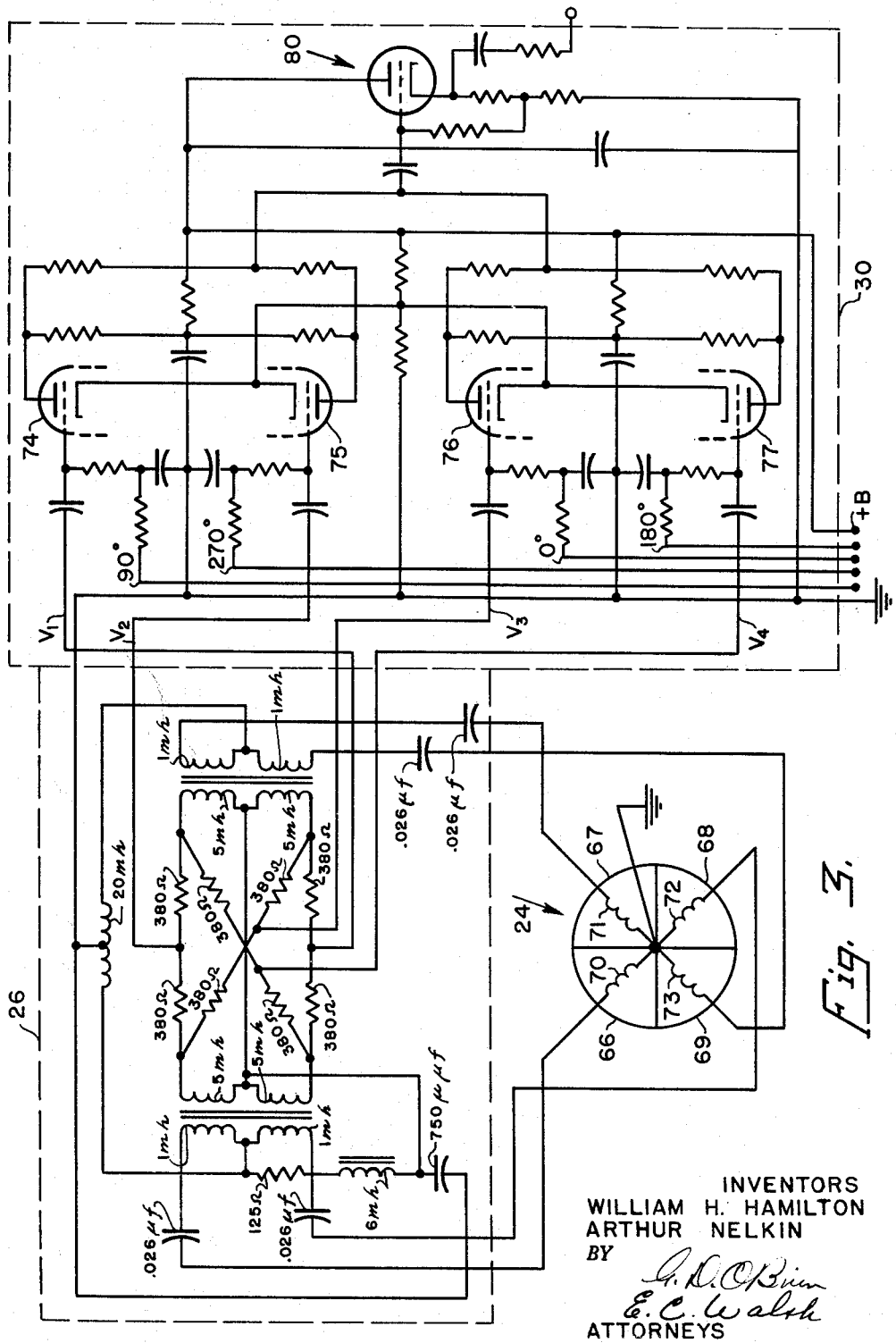

United States Patent Office 3,180,296
Patented Apr. 27, 1965

3,180,296
CONTINUOUS WAVE ACOUSTIC
GUIDANCE SYSTEM
William H. Hamilton and Arthur Nelkin, Pittsburgh, Pa., assignors, by mesne assignments, to the United States of America as represented by the Secretary of the Navy
Filed Mar. 5, 1954, Ser. No. 414,525
7 Claims. (Cl. 114—23)

This invention relates to acoustic guidance systems, and in particular to a continuous wave acoustic guidance system for torpedoes.

Acoustic guidance systems for torpedoes are divided into two main classes; passive systems which detect acoustic energy radiated by the target and guide a torpedo toward the source of the acoustic energy, and active systems in which the torpedo transmits acoustic energy and the guidance system uses the reflected acoustic energy to guide the torpedo to the target.

Previously known active systems are pulsed systems; i.e., they periodically transmit a short pulse of acoustic energy and then listen for the pulse of acoustic energy reflected from a target. From the reflected acoustic energy or target echo which is received, the bearing of the target relative to the torpedo can be determined.

The active acoustic guidance system constituting this invention continuously transmits acoustic energy having a substantially constant frequency. The frequency of the acoustic energy reflected from a target, or the target signal, is greater than that of the transmitted energy by the Doppler shift due to the closing velocity of the torpedo relative to the target. Transmitter leakthru and reverberation signals are attenuated by means of filters. The target signal is received by a four segment transducer. The relative phase angles of the target signals available from the segments of the transducer depend upon the relative bearing and elevation of the target with respect to the torpedo. A phase-to-amplitude converter operates upon these target signals to provide four output voltages which define target direction by their relative amplitudes. A lobing commutator, comprising four amplifiers whose gains are modulated in quadrature sequence at a lobing frequency under control of a lobing generator, operates upon the four output voltages of the phase-to-amplitude converter, to provide a single-channel amplitude-modulated target signal, in which the phase of the modulation envelope varies in accordance with target direction and thus carries the steering information which is extracted and used to control the azimuth and depth steering means of the torpedo to guide the torpedo to the target.

In active acoustic guidance systems, it is deirable to reduce the band width of the receiver of the system in order to obtain maximum improvement in the signal to noise ratio. In pulsed active acoustic guidance systems the optimum band width of the receiver is rather large since it is a reciprocal function of the length of the transmitted pulse. In a continuous wave active acoustic guidance system, the theoretical optimum band width of the receiver may be determined in like manner. Since the emission of a continuous wave system can be considered an infinitely long pulse, a very narrow receiver band width can be used with consequent improvement in the signal to noise ratio of the receiver.

As the speed of a torpedo is increased the level of the noise generated within the torpedo increases and the noise generated by the movement of the torpedo in the water also increases. In a pulsed active guidance system the noise generated by a high speed torpedo greatly limits the range at which a target can be detected. A continuous wave system carried in a similar high speed torpedo can detect a target at a considerably greater range because of the much higher signal to noise ratio of the receiver of the system.

A further advantage of a continuous wave acoustic guidance system resulting from the narrow band width of the receiver is the decreased susceptibility of the system to counter measures. Once the system has locked on a target, it ignores all signals differing from the target signal by more than the very narrow band width of the receiver.

It is, therefore, an object of this invention to provide a continuous wave acoustic guidance system for torpedoes.

It is a further object of this invention to provide a continuous wave acoustic guidance system which is particularly suitable for use in high speed torpedoes.

It is a still further object of this invention to provide a continuous wave acoustic guidance system for torpedoes which is relatively insusceptible to counter measures.

It is another object of this invention to provide an acoustic guidance system that will not home on the surface or bottom of the sea.

Other objects and many of the attendant advantages of this invention will be readily appreciated as the same become better understood by reference to the following detailed description when considered in connection with the accompanying drawing wherein:

FIG. 3 is a schematic diagram of the transducer, phase-to-amplitude converter, and amplifier type of lobing commutator;

Figure 1:
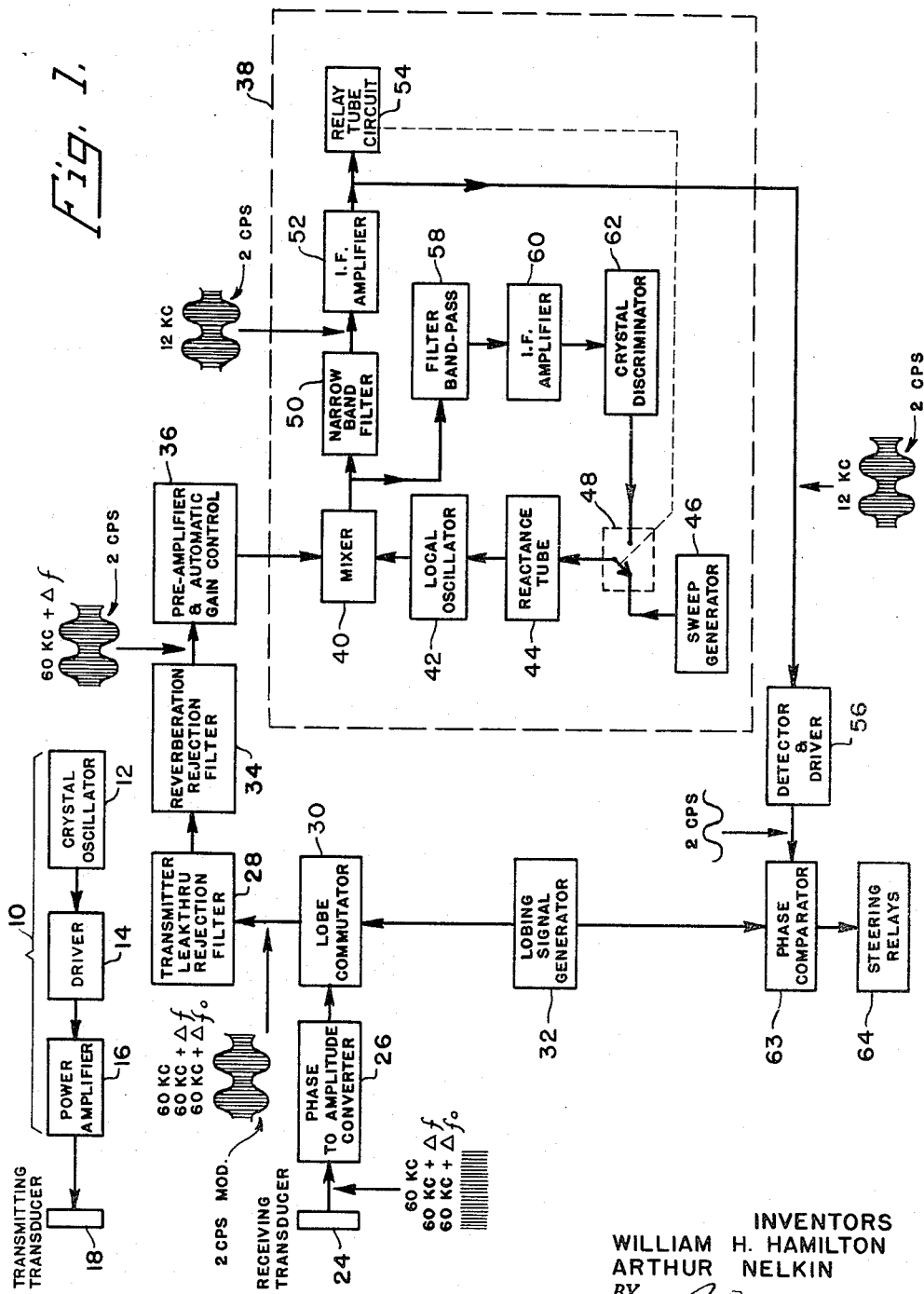
FIG. 1 is a block diagram of the invention.
Figure 5:
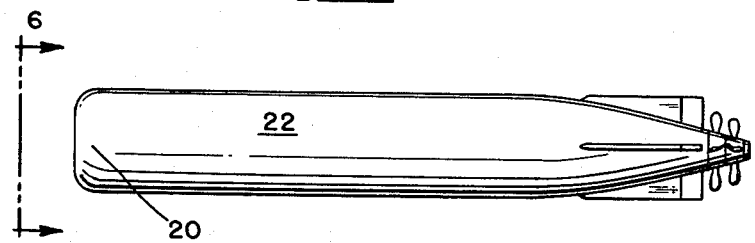
FIG. 5 is a side elevation of a torpedo in which the invention is adapted to be mounted.
Figure 6:
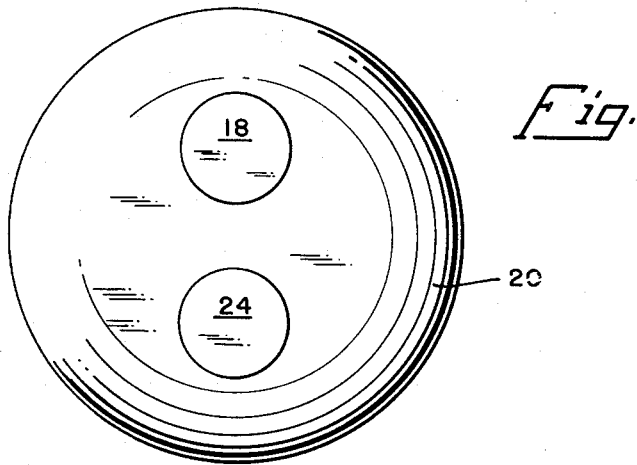
FIG. 6 is an enlarged elevation of the torpedo seen in FIG. 5.

Referring to FIG. 1, electrical energy from a conventional transmitter 10, which consists of a crystal oscillator 12, a driver 14, and power amplifier 16, is applied to magnetostrictive transmitting transducer 18 which converts the electrical energy into acoustic energy. The frequency of the continuous wave acoustic energy transmitted is at the same frequency as the electrical energy applied, and in a preferred example is 60 kc. The amplitude of the transmitted acoustic energy is substantially constant. Transmitting transducer 18 is mounted in the nose portion 20 of torpedo 22 as seen in FIGS. 5 and 6. Receiving transducer 24 is also mounted in the nose portion 20 of torpedo 22. Transmitted acoustic energy is formed by transducer 18 into a fairly broad beam whose axis is substantially parallel to the longitudinal axis of torpedo 22. The axis of the receiving pattern of transducer 24 likewise is substantially parallel to the longitudinal axis of torpedo 22.

Figure 2:
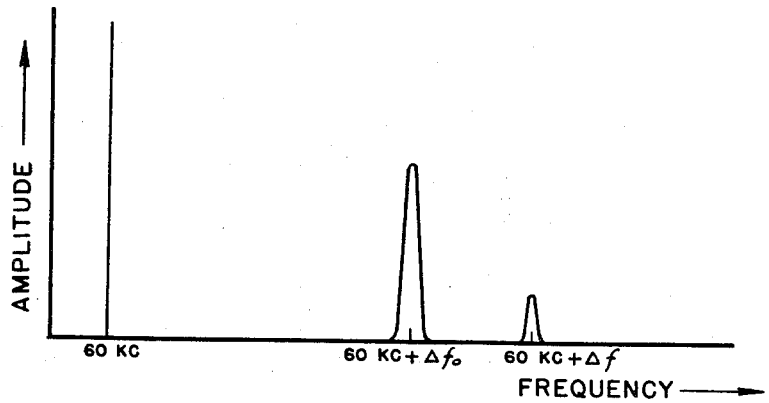
FIG. 2 is a plot of the spectrum of the signal received by the invention when a single target is present.

Receiving transducer 24, which is a four segment magnetostrictive transducer, converts incident acoustic energy into electrical energy of the same frequency as the incident acoustical energy. In FIG. 2 are shown the several components, or spectrum, of the signal output of transducer 24 during torpedo operation in the presence of a target. One component of the signal output of each segment of transducer 24 is due to leakthru of the transmitted signal and has the same frequency, 60 kc., as the transmitted signal. A second component is due to reverberation or the reflection of transmitted energy from relatively stationary discontinuities in the medium through which the torpedo is traveling. The frequency of the reverberation, 60 kc.$+\Delta f_0$, differs from the frequency of the transmitted signal by the amount $\Delta f_0$ which is due to the Doppler shift resulting from the speed of the torpedo in the water. The third component of the signal output of the transducer 24 is due to acoustic energy reflected from a target, or the target signal. Suitable filter networks are employed to substantially eliminate the leakthru and reverberation component signals as later described, and in order for the target signal to be detected its frequency, 60 kc.+$\Delta f$, must therefore differ from the frequency of the reverberation by more than a predetermined minimum amount. This continuous wave acoustic guidance system thus recognizes only a target which has a component of velocity parallel to the longitudinal axis of the torpedo 22, the normal direction of movement of the torpedo, and whose magnitude is great enough to make the frequency of the reflected signal differ a sufficient amount from the frequency of the reverberation signal. The minimum value of this component velocity in a preferred form is substantially ±1.5 knots. Because of this minimum target speed characteristic, the system cannot detect nor be decoyed by echoes from the surface or the bottom of the sea or from any immobile object in the sea.

When the target lies along the longitudinal axis of the torpedo, acoustic energy reflected from the target is received in equi-phase condition at each of the four segments of transducer 24. The four voltages produced by the four transducer segments are correspondingly in phase. When a target is not on the axis of torpedo 22, the four voltages produced by the segments of transducer 24 from the transmitted acoustic energy reflected from the target are not in phase. From the relative phase angles of the voltages produced by the four segments of transducer 24 it is possible to determine the bearing and elevation of the target with respect to the longitudinal axis of torpedo 22.

To do this, the voltages produced by the four segments of transducer 24 are applied to phase-to-amplitude converter 26, which is well known to those skilled in the underwater acoustic art. The amplitude of each of the four output signals of phase-to-amplitude converter 26 is a function of the relative phase angles of the signals applied from the segments of transducer 24 as will be more fully explained later.

The output signals of phase-to-amplitude converter 26 have the same carrier frequencies as the voltages produced by receiving transducer 24. The four output signals of the phase-to-amplitude converter 26 are connected in a predetermined sequence and at a predetermined rate to the leakthru rejection filter 28 by lobing commutator 30 which is controlled by the output of lobing signal generator 32. The switching action of lobing commutator 30 in a preferred example is at a rate of 2 cycles per second.

The output voltage of lobing commutator 30 thus acquires a 2 cycle per second amplitude modulation. The output voltage of lobing commutator 30 is applied to transmitter leakthru rejection filter 28 and reverberation rejection filter 34 where the voltage components due to leakthru and reverberation are rejected so that only the amplitude modulated target signal remains. The phase of the modulation envelope of the amplitude-modulated target signal depends upon the bearing and elevation of the target relative to torpedo 22. When the target lies along the longitudinal axis of the torpedo the voltages induced in the segments of transducer 24 are in phase, and the output voltage of commutator 30 will have no amplitude modulation.

Torpedo 22 is designed to operate at substantially a constant speed so that the frequency of the reverberation for this speed can be determined and filter 34 can be designed to reject only signals of substantially that frequency.

The target signal with 2 cycles per second amplitude modulation is applied to a conventional pre-amplifier and automatic gain control circuit 36 and then to narrow band automatic frequency search and following receiver 38. The function of receiver 38 is to search a predetermined band of frequencies in which an amplitude modulated target signal of unpredictable and variable carrier frequency may be present, to lock on the target signal when found, and to follow, or track, the target signal even though its carrier frequency may change due to variations in the closing rate between the target and torpedo 22. When a target signal is present and "locked on," receiver 38 produces an output voltage which has a substantially constant intermediate frequency and whose modulation envelope is in phase with that of the amplitude-modulated target signal.

Target lockup receiver 38, in a preferred form, consists of a mixer 40 to which the target signal from preamplifier 36 is applied. In mixer 40 the output voltage of local oscillator 42 is heterodyned with the amplitude-modulated target signal. The frequency of local oscillator 42 is controlled by reactance tube and storage circuit 44 and by sweep generator 46 through switch 48. Before the target lockup receiver locks on the target signal, local oscillator 42 sweeps through a band of frequencies, from 72 to 75 kc. in a preferred example. This is accomplished by applying the output of the sweep generator 46 to the reactance tube 44 through switch 48.

The output signal of mixer 40 is applied to the narrow band filter 50 which is adapted to pass a signal at the intermediate frequency of 12 kc. in this example, and which has a band width of 10 cycles at the 3-db down points. The output of filter 50 is applied to a conventional I.F. amplifier 52 and the output voltage of I.F. amplifier 52 is applied to relay tube circuit 54 and detector and driver circuit 56. The output of mixer 40 is also applied to band pass filter 58 which has a 40 cycles per second band width, and is then applied to the I.F. amplifier 60. The output of amplifier 60 is applied to discriminator 62.

When a target signal is present, and as the frequency of the local oscillator is varied by sweep generator 46 and reactance tube and storage circuit 44, the frequency of the output signal of mixer 40 will equal the I.F. frequency of 12 kc. at some particular time and the output signal then developed by I.F. amplifier 52 will be applied to relay tube circuit 54. The application of the signal from amplifier 52 to relay tube circuit 54 causes switch 48 to disconnect sweep generator 46 from reactance tube and storage circuit 44 and to connect the output of crystal discriminator 62 to reactance tube circuit 44. Discriminator 62 will then control the frequency of local oscillator 42 to keep the intermediate frequency output of mixer 40 centered at 12 kc. The modulation envelope of the output voltage of receiver 38 is in phase with the modulation envelope of the amplitude-modulated target signal. The modulated output voltage of receiver 38 is applied to detector and driver 56 which extract and amplify the modulation component. The phase of this modulation component relative to lobing signals developed by signal generator 32 is then in effect determined by phase comparator 63. The phase of the modulation component depends upon whether the target is above or below and to the right or to the left of torpedo 22, and phase comparator 63 derives therefrom relay-energizing voltages which are used to position steering relays 64, which are adapted to correspondingly control the azimuth and depth steering means of the torpedo to steer the torpedo toward the target.

In FIG. 3 a wiring diagram of a preferred form of a phase-to-amplitude converter 26 and lobe commutator 30 are illustrated. A schematic front elevation of the four segments 66, 67, 68, 69 of transducer 24 is also illustrated. Signals are induced in coils 70, 71, 72, 73 of each segment by incident acoustic energy. The induced signals are of the same frequencies as the incident acoustic energy and will have phase angles with respect to one another determined by the bearing and elevation of the source of the incident acoustic energy relative to the longitudinal axis of torpedo 22. One terminal of each of the coils 70, 71, 72, 73 is connected to ground. The signals induced in coils 70, 71, 72, 73 are then applied to the phase-to-amplitude converter 26. The phase-to-amplitude converter is a network, as illustrated, which operates upon the transducer signals to provide output voltages such that if a target is above the longitudinal axis of the torpedo the amplitude of voltage $V_1$ will be greater than the amplitude of voltage $V_2$, and if below, the amplitude of voltage $V_2$ will be greater than the amplitude of voltage $V_1$. If the target is to the right of the longitudinal axis of the torpedo 22, the amplitude of voltage $V_4$ will be greater than the amplitude of voltage of $V_3$, and if the target is to the left, then the amplitude of voltage $V_3$ will be greater than the amplitude of voltage $V_4$. In order that the well-known phase-to-amplitude converter 26 shall function properly, and in association with conventional and uniform winding configurations of the coupling transformers therein, the connections of the transducer coils are made in such a manner that, for a straight-ahead target, the resultant voltages delivered by one pair of diagonally opposite transducer segments are in phase-opposition to the voltages delivered by the other pair of diagonally opposite transducer segments. The output voltages or signals $V_1$, $V_2$, $V_3$, $V_4$ of phase-to-amplitude converter 26 are applied to the grids of tubes 74, 75, 76, 77, which are illustrated as being double triodes, of lobe commutator 30. Four voltages from lobing signal generator 32 which are respectively 90°, 270°, 0° and 180° out of phase with respect to each other and at a frequency of 2 cycles per second, in a preferred form, are used to supply grid bias to tubes 74, 75, 76, 77. The lobing commutator thus connects, in a predetermined sequence, voltages $V_1$, $V_2$, $V_3$, $V_4$ to cathode follower 80. The output voltage of cathode follower 80 then has a 2 cycle per second amplitude modulation if $V_1$, $V_2$, $V_3$, $V_4$ are not equal. Lobing signal generator 32, in a preferred form, is a conventional sine-cosine potentiometer driven by a constant speed motor.

Figure 4:
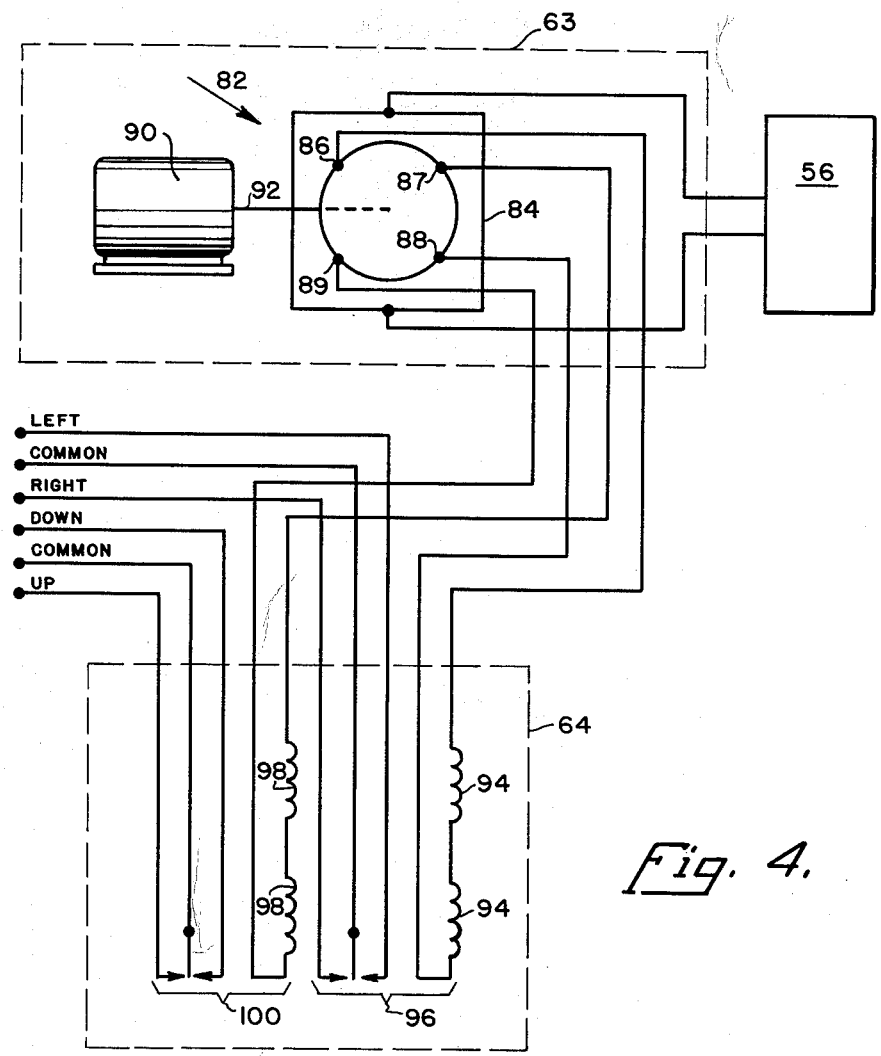
FIG. 4 is a schematic diagram of the phase comparator and the steering relays.

FIG. 4 is a schematic diagram which illustrates a preferred form of phase comparator 63 and steering relays 64 operated thereby. Phase comparator 63 comprises a sine-cosine potentiometer 82, consisting of a resistance card 84 and contacts 86, 87, 88, 89 which engage card 84, and constant speed motor 90 which rotates resistor card 84 about its center by means of shaft 92. Motor 90 is the same motor which drives the sine-cosine potentiometer of lobing signal generator 32. Resistance card 84 is thus rotated at the same angular frequency as the modulation frequency applied by lobe commutator 30, and its orientation has a predetermined relationship with the voltages from lobing signal generator 32. The demodulated signal from detector and driver 56 is applied across resistance card 84 and, as detailed in copending U.S. patent application Serial No. 451,994 of Raymond U. Sims and Frederick J. Leonard, filed 5 March 1954, entitled "Phase Comparator," and now Patent No. 2,855,566, the synchronously rotating potentiometer card 84 operates to derive therefrom a pair of relay-controlling voltages corresponding to the azimuth and elevation directions of the target.

The coils 94 of polarized relay 96 are connected in series with contacts 86 and 88, and coils 98 of polarized relay 100 are connected in series with contacts 87 and 89. The phase of the detected modulation of the amplitude-modulated target signals determines the direction of resultant current flow through coils 94 and 98, and the direction of flow determines which of the contacts of relays 96, 100 are closed. When a target is to the left of torpedo 22, relay 96 will be energized in such a manner as to complete a circuit from the "left" terminal to the adjacent "common" terminal. Completion of this circuit will cause the azimuth steering means of the torpedo to turn the torpedo to the left. In a similar way the torpedo can be steered to the right, up, and down. In this manner, the guidance system controls the azimuth and depth steering means of the torpedo and guides the torpedo toward the target. When the target lies on the axis of torpedo 22 no signal is obtained from detector 56 so that no steering control is applied to the steering means of the torpedo and it proceeds in a substantially straight course.

The high signal to noise ratio obtained with the narrow band width of receiver 38, which in this instance is practicable because of the continuous rather than pulse transmission of acoustic energy by the guidance system, makes this system capable of detecting a target at long ranges even though the guidance system is mounted in a high speed and consequently noisy torpedo. Since the target, to be detected, must have a minimum component of velocity in the normal direction of movement of the torpedo, the torpedo can not detect nor be decoyed by reflected acoustic energy from the surface or bottom of the sea. The narrow band width of signals which can pass through filter 50 of receiver 38 makes it difficult to countermeasure the guidance system since the guidance system will ignore any and all signals which deviate by more than ±5 cycles from the target signal, after once locking on the target signal.

Obviously many modifications and variations of the present invention are possible in the light of the above teachings. It is therefore to be understood that within the scope of the appended claims the invention may be practiced otherwise than as specifically described.

What is claimed is:

1. An acoustic guidance system for a torpedo having steering means, comprising means for transmitting continuous wave acoustic energy, means for forming transmitted acoustic energy reflected from the target into an A.C. signal having a modulation envelope determined by the bearing and elevation of the target with respect to the torpedo, means for demodulating said signal, and means for controlling the steering means of the torpedo responsive to said demodulated signal to steer the torpedo toward the target.

2. An acoustic guidance system for a torpedo having steering means and a longitudinal axis, comprising means for transmitting continuous wave acoustic energy at a substantially constant frequency, means for receiving transmitted acoustic energy reflected from a target having a component of velocity along the longitudinal axis of the torpedo, means for forming the received acoustic energy reflected from the target into an A.C. signal having a substantially constant intermediate frequency and a modulation envelope which is determined by the bearing and elevation of the target with respect to the torpedo, means for demodulating the A.C. signal, and means for controlling the steering means of the torpedo responsive to the demodulated A.C. signal to steer the torpedo toward the target.

3. In an acoustic guidance system as defined in claim 2, in which the minimum value of the component of target velocity along the longitudinal axis of the torpedo is substantially one and one-half knots.

4. An acoustic guidance system for a torpedo having a longitudinal axis and azimuth and depth steering means, comprising means for transmitting continuous wave acoustic energy at a substantially constant frequency, means forming the transmitted continuous wave acoustic energy reflected from a target having a component of velocity parallel to the longitudinal axis of the torpedo into a plurality of electrical signals having phase angles with respect to each other which are determined by the bearing and elevation of the target relative to the torpedo, means for forming the plurality of electrical signals into a single signal having a substantially constant intermediate frequency and whose modulation envelope is determined by the phase angles of said plurality of electrical signals, means for demodulating said single signal and means for controlling the steering means of the torpedo responsive to said demodulated single signal to steer the torpedo toward the target.

5. An acoustic guidance means for a torpedo having propulsion means and azimuth and depth steering means, comprising a transmitting transducer; an oscillator adapted to oscillate at a substantially constant frequency and amplitude and adapted to energize said transmitting transducer; a four segment receiving transducer adapted to produce four output signals, components of each of said four output signals being due to transmitter leakthru, reverberation, and transmitted acoustic energy reflected from a target; a phase to amplitude converter to which are applied the four output signals of the receiver transducer and which is adapted to produce four output voltages whose amplitudes are functions of the relative phase angles of the four output signals of said receiver transducer; a commutator; a transmitter leakthru rejection filter; a reverberation rejection filter; said commutator adapted to apply one at a time, in a prescribed sequence, and at a predetermined rate the four output voltages of said phase to amplitude converter to said filters, the output signal of said filters containing a component due to the target signal and having a modulation envelope determined by the output voltages of said phase to amplitude converter; a target lockup receiver for searching for, for locking on, and for following the modulated target signal, and for producing an output voltage of substantially constant intermediate frequency whose modulation envelope is in phase with the modulation envelope of the modulated target signal; a detector for demodulating the output voltage of the target lockup receiver; a phase comparator adapted to derive relay control voltages from the demodulated output voltage of the receiver; and relay means controlled by said phase comparator and adapted to control the azimuth and depth steering means of the torpedo.

6. An acoustic guidance system for a torpedo having a longitudinal axis, propulsion means for moving said torpedo through the water, and azimuth and depth steering means, comprising means for transmitting continuous wave acoustic energy in a beam having an axis, the axis of the beam being substantially parallel to the longitudinal axis of the torpedo; receiver transducer means having a receiving pattern having an axis, the axis of said receiving pattern being substantially parallel to the longitudinal axis of the torpedo; said receiver transducer means having four segments, each segment of which is adapted to produce electrical signals corresponding to the acoustic energy incident on each segment, the electrical signals produced including components due to reverberation, transmitter leakthru, and transmitted acoustic energy reflected from a target; converter means for converting phase angle differences between the four signals produced by the segments of said receiver transducer to four output signals whose amplitudes are functions of said phase angles; commutator means, controlled in synchronism with quadrature voltages provided by a reference signal generator at a predetermined lobing frequency, for sequentially connecting the output signals of said converter means into a single-channel voltage having a modulation envelope variable in phase, relative to quadrature voltages from said reference signal generator, in accordance with target directions in azimuth and depth; filter means for rejecting the transmitter leakthru component and reverberation component of said signal-channel voltage; heterodyning receiver means for searching for the modulated target signal component, for locking on said target signal component, for following frequency variations thereof, and adapted to produce an output voltage of substantially constant intermediate frequency whose modulation envelope is in phase with that of the modulated target signal component; means for demodulating the output voltage of said receiver; phase comparing means for operating upon said demodulated receiver output voltage to produce output voltages corresponding to target directions in azimuth and depth; and means adapted to control azimuth and depth steering means of the torpedo responsive to the output voltages of said phase comparator means.

7. An electro-acoustic underwater target locating system for use in mobile water-craft, comprising: means for generating and beaming continuous wave-fixed frequency acoustic energy along a reference direction toward a suspect underwater target region; means for receiving and converting resultant echoes, arising by moving-target reflection of said acoustic energy, to an amplitude-modulated target signal having modulation-envelope characteristics dependent upon target direction relative to said reference direction, said target signal having unpredictable carrier frequency which is Doppler-shifted from said fixed frequency in accordance with the target velocity component relative to said mobile water-craft and along said reference direction; circuit means for substantially isolating said target signal from other signals, said circuit means comprising tuned rejection filters for attenuating leakthru acoustic energy at said fixed frequency and spurious water reverberation and non-mobile target signals at ing like modulation-envelope characteristics corresponding to the speed of said mobile water-craft; a heterodyning and automatic frequency control circuit for converting said isolated target signal to a heterodyned target signal at substantially fixed intermediate frequency and having like modulation-envelope characteristics correspondingly dependent upon target direction relative to said reference direction; means for extracting the modulation-envelope component of said heterodyned target signal; and means for deriving, from said modulation-envelope component, output voltages corresponding to and definitive of target direction relative to said reference direction.

References Cited by the Examiner

UNITED STATES PATENTS

| | | | |
|---|---|---|---|
| 2,268,587 | 1/42 | Guanella. | |
| 2,409,632 | 10/46 | King | 114—21.2 |
| 2,504,118 | 4/50 | Evans | 340—6 X |
| 2,524,180 | 10/60 | Shuck. | |

BENJAMIN A. BORCHELT, *Primary Examiner.*

NORMAN H. EVANS, *Examiner.*

UNITED STATES PATENT OFFICE
CERTIFICATE OF CORRECTION

Patent No. 3,180,296                                          April 27, 1965

William H. Hamilton et al.

It is hereby certified that error appears in the above numbered patent requiring correction and that the said Letters Patent should read as corrected below.

Column 8, line 37, for "ing like modulation-envelope characteristics" read -- a predetermined Doppler-shifted frequency --.

Signed and sealed this 5th day of October 1965.

(SEAL)
Attest:

ERNEST W. SWIDER                                      EDWARD J. BRENNER
Attesting Officer                                          Commissioner of Patents